INVENTORS
WERNER FLIEG
RALPH BERGER
BY Frank K. Roberts
ATTORNEY

Oct. 18, 1966 W. FLIEG ETAL 3,279,365

HIGH SPEED BELT PRINTER WITH COMPARISON MEANS

Filed May 15, 1964 4 Sheets-Sheet 2

INVENTORS
WERNER FLIEG
RALPH BERGER
BY
ATTORNEY

HIGH SPEED BELT PRINTER WITH COMPARISON MEANS

Filed May 15, 1964 4 Sheets-Sheet 3

INVENTORS
WERNER FLIEG
RALPH BERGER
BY
[signature]
ATTORNEY

Oct. 18, 1966 W. FLIEG ETAL 3,279,365

HIGH SPEED BELT PRINTER WITH COMPARISON MEANS

Filed May 15, 1964

4 Sheets-Sheet 4

INVENTORS
WERNER FLIEG
RALPH BERGER
BY
ATTORNEY

United States Patent Office 3,279,365
Patented Oct. 18, 1966

3,279,365
HIGH SPEED BELT PRINTER WITH COMPARISON MEANS

Werner Flieg, Newton Center, and Ralph Berger, Wellesley, Mass., assignors to Invac Corporation, Waltham, Mass.

Filed May 15, 1964, Ser. No. 367,639
7 Claims. (Cl. 101—96)

This invention relates to printing apparatus.

A principal object of the inevntion is to provide a low cost, relatively high speed serial printer. The reason for this object is the gap between low speed equipment and equipment in the high speed printer class. Known lower-speed devices are slow, mechanically complicated, inflexible functionally on both an on-line and an off-line basis, and unsuitable for many applications. The high speed printers, while fast, are bulky, require a large electronic buffer, and are quite limited for low or medium speed applications, mainly because of the high cost and size.

To obtain a low cost faster printer to fill the void, it is proposed that the equipment preferably be serial in nature rather than parallel, thus reducing hardware requirements both electronically and mechanically. A problem, however, exists in how to obtain a serial mechanical action without requiring the use of complicated mechanisms. The problems experienced with an earlier approach were that rotating vertical wheels which were required had a fixed number of characters and were expensive; that a massive hammer solenoid was required which traveled on a columnar basis and limited growth potential; and that, in addition, a very slow carriage return time and need for frequent adjustments was characteristic.

To make a massive object go faster and faster is a brute force method compared to finding an approach where only a small, light section of a hammer need be moved. Since full parallel techniques are preferably eliminated, the problem to solve was how to move only the portion of the hammer that contacted the print characters and still keep the hammer stationary. With a complicated interposer system, this could be arranged, but then most of the gains would be lost because of difficulty in aligning each interposer and the problems of repeatability throughout the columns for millions of operations. Therefore, another concept considered was the use of a rotary helix to eliminate the interposers. The helix would present a print pellet or equivalent at the first column and, as the helix was rotated upon demand, vary the columnar position of one column at a time with perfect indexing. This method was subsequently discarded because of the difficulty in obtaining the equivalent of high speed carriage return and because it did not lend itself to fast tabulation.

The next approach used a hammer solenoid fixed in position at the center of the page printer, with a hammer element pivoted in the vertical plane. With a rack and pinion assembly at the base of the hammer element, the hammer solenoid was actuated at the proper time to strike the selected character; then a stepping motor was indexed to move the element to column 2. This method was also subsequently discarded, since the radius at point of impact would vary throughout. The upper portion of the hammer element obstructed the operator's view and also projected above the paper. The difficulty of maintaining repeatability of hammer action with the radius constantly changing column by column was first attacked by varying the hammer element width to compensate for changes in radius, thus obtaining equal time of flight throughout the range. The close dimensional tolerances required for repeatability tended to offset a good portion of the gains over parallel printing methods. This method would be acceptable only if small quantities were required.

With the problems above defined, a method was required allowing a hammer to be fixed in position, requiring only a small amout of movement at its head, and permitting coordination with a print head carrier. A belt carrier method was evolved which served as the basis for a simple mechanism with functional flexibility. The character carrier approach on the horizontal belt basis was employed because of known difficulties with the print roll system. With the print roll system, fixed diameters is a limitation which means that longer access time is required to reserve space for a large number of characters. The difficulties in the manufacture of print rolls are as follows: (1) The print roll basic structure must be machined precisely and can be easily damaged at any point in the process; (2) The bearing supports for the print roll are quite critical and subjected to high load factors; (3) If the character wheels are sectioned, there is a problem of maintaining concentricity and alignment; (4) If the characters are placed on the roll unsectioned, damage to any one character spoils the entire assembly; (5) The sectional print rolls are difficult to change in the field; (6) It is difficult to design a print roll mounting where the whole roll can be removed economically, and even if this is solved the characters must be placed on the roll at the factory; (7) The print rolls are heavy and require many manufacturing operations; (8) The timing accuracy of the hammers cooperating with the print roll must be inherently higher, since variations in vertical alignment are not tolerable to the eye.

All these factors tended to support the horizontal plane, rotary printing mechanism approach. A horizontal wheel was not considered practical because of the difficulty of handling paper in a trough while printing. One of the early high speed printers used this technique to obtain good vertical alignment, but the paper handling problem was so severe that it was almost impossible to use various paper widths.

For system flexibility the internal machine language employed in accordance with the invention is preferably digital and simply translated to any code up to 8 bits or more potentially. If magnetic position sensors are used, high order of machining accuracies are required. The coding, it would appear, would have to be done by either complicated and expensive external electronic circuitry, or in parallel magnetically with attendant code changing problems. Some early code translation methods included variations of photoelectric tape readers with endless tape loops, photoelectric position indicators with external electronic counters. However, not one of these methods could be adapted directly to the invention in an economic universal fashion.

The print pellet carrier belt technique which forms a part of the system proposed herein was selected to eliminate the need for moving a high mass at high speed and to eliminate complicated mechanisms. The horizontal print belt was chosen to obtain character selection with a minimum total number of characters in an economic and practical way and still permit excellent vertical alignment. The code belt was selected to obtain machine language compatibility with any code inherent in the equipment in an uncomplicated fashion.

Printing systems may be classified into two general types: non-impact printing and impact printing. Non-impact systems require special papers or processes and do not produce simultaneous copies. Because of the many advantages of impact printing, it has been selected as the proposed approach in order to use single or multi-part forms, ordinary papers, and simplified design techniques.

Many methods of impact printing have been successful for low speed commercial applications. Individual type bars for each printable character, utilizing its own element as its hammer and grouped in a typebasket, is a well-known system. The single rotary print wheel system, either continuous or intermittent, may use the wheel as its own hammer or may use a separate hammer element directly or with an interposer.

A variation of this system, paralleling the type wheels, has been successfully used in "high-speed" printing mechanism where the high speed is obtained by line-at-a-time action.

However, the serial speed is only about 15 characters per second. The "golf ball" print head system, presently used in some typewriter systems, and the cylindrical type heads used in the recent teletypewriter systems, are variations of approaches used since the early 1900's. Other variations of the rotary type wheel systems are the large horizontal print wheel, and the chain printer, used on another form of high speed parallel printer.

All of the above systems have severe limitations in flexibility, durability, size and costs as well as in meeting all aspects of the requirements.

Because of these limitations, certain criteria were formulated relative to the invention:

(1) The method should use a true serial mechanism to reduce the costly electronic buffer requirements.

(2) The system should use an approach with a simple mechanism to reduce the number of elements moving at high speed in order to obtain reliability.

(3) Adaptability to individual type change must be inherent for field changes.

(4) In concept, the printer should be adaptable to various paper widths, such as 3" to 36".

(5) The character set should basically be adjustable to any reasonable number, such as 10 to 132 characters nominally for flexibility.

(6) Number of clear copies accommodated should be a minimum of 6, preferably 10.

(7) Equivalent carriage return time to be a maximum of 1 character time as a goal. Line feed also should be within 1 character time as a goal. Both may be simultaneous. The platen or carriage must be stationary to reduce paper handling problems.

(8) Rugged constructed usable over wide environmental conditions.

(9) Speed should be in the 20 to 100 characters per second range.

(10) Adaptability to any code with simple changeover.

(11) Asynchronous operation up to top speed is important for various communication and data processing activities.

To achieve the above and other of its objectives, the invention contemplates the provision of a serial print apparatus comprising a source of paper adapted for feeding paper along a determinable path and a source of print ribbon including ribbon-feeding and take-up mechanisms adapted for supplying said ribbon in juxtaposed relationship to said paper transversely of said path.

The invention, moreover, contemplates the provision of hammer and character presenting means sandwiching the aforesaid paper and ribbon therebetween, the character presenting means comprising an endless belt arranged transversely of said path and a plurality of character bars detachably mounted on the belt.

In accordance with the preferred embodiment of the invention, first drive means is provided which is adapted for continuously driving the aforesaid belt and displacing said character bars transversely of the aforesaid path. Moreover, there is provided a code belt coupled to the drive means and driven thereby in synchronism with the endless belt, the code belt being provided with coded arrangements of holes corresponding to and identifying respective of the aforesaid character bars.

In accordance with a particular feature of the invention, there is provided a print pellet with second drive means being coupled to and adapted to displace this pellet stepwise through a sequence of print positions arranged transversely of the above-noted path. This pellet is displaced both towards the endless belt to impel said paper and ribbon against a selective one of the aforenoted character bars.

In addition and as a further feature of the invention, there is provided a light source with means operatively associated therewith to direct light through holes in the code belt, there being further provided photoelectric means adapted for inspecting the coded arrangements of holes and a masking belt arranged between the photoelectric means and code belt for generally isolating the same.

The aforenoted masking belt is provided with an opening for selectively exposing the code belt to the photoelectric means for selective inspection of the coded arrangement of holes, the masking belt being coupled to the second noted drive means for being driven in synchronism with the above-noted pellet.

According to a further aspect of the invention, the hammer means includes a hammer operatively disposed with respect to the above-noted pellet in any position of the latter to engage the said pellet and propel the same towards the endless belt, the hammer means further including a cam device engaging the hammer and being adapted upon actuation to propel the hammer against the pellet.

In addition there is provided a comparison means for receiving an electrical signal indicative of a character to be printed, the comparison means being coupled to the photoelectric means to receive electrical signals therefrom representative of the character bars and to compare the first said signal therewith.

The comparison means is coupled to the hammer means to actuate the cam device to in turn actuate the hammer upon determining identity between compared signals.

In addition delay means is provided which is coupled to the comparison means and the second said drive means to actuate the latter to advance the pellet following an actuation of the said cam device and to generate an electrical signal indicative of the performance of a printing operation.

The invention will be more clearly understood from the following detailed description of some preferred embodiments as illustrated in the accompanying drawing in which.

Generally speaking, the apparatus of the invention is intended to respond to an externally supplied electrical signal by effecting a printing operation related to a character designated by said signal.

Figure 1:
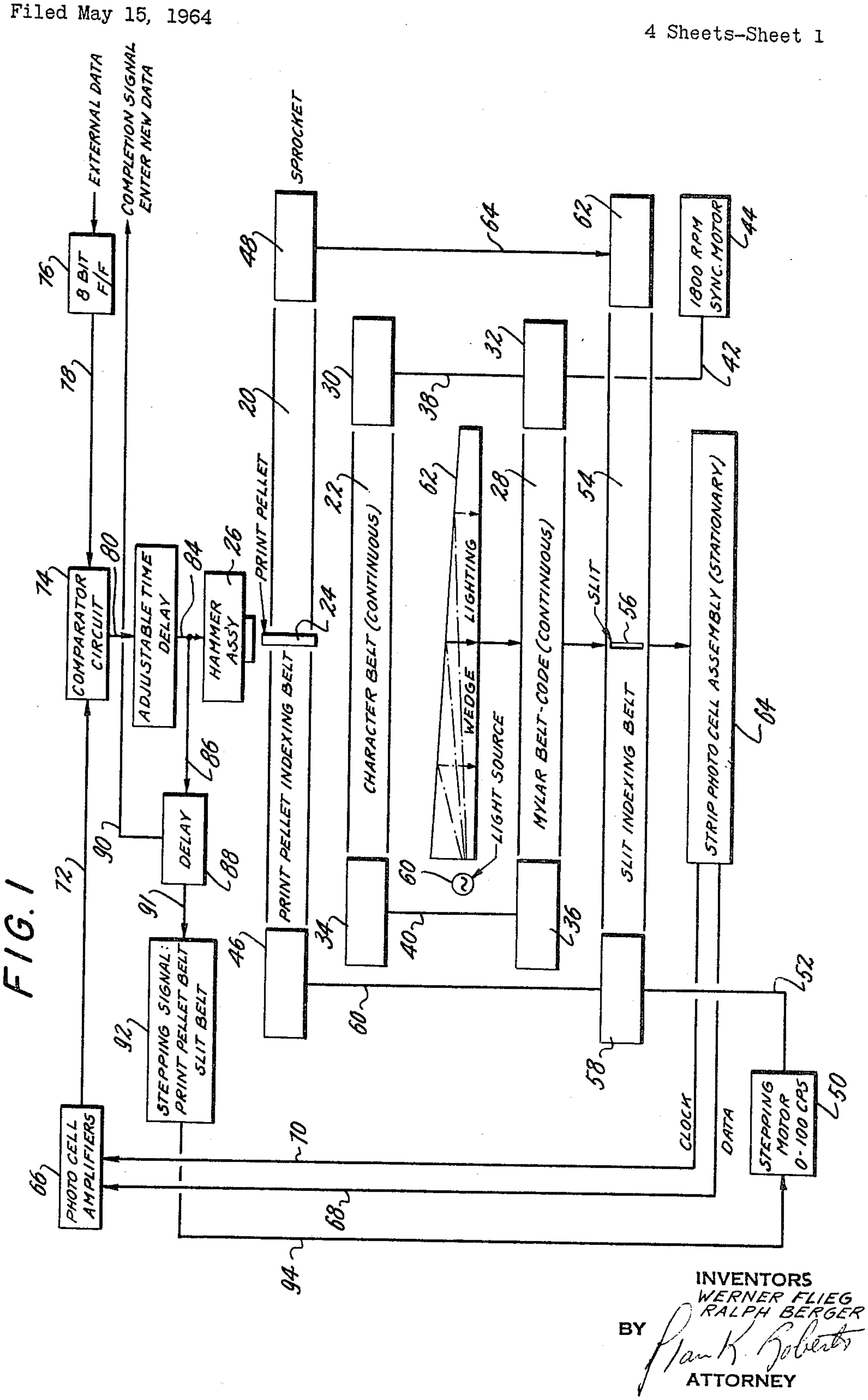
FIGURE 1 is a block diagram illustrating the various elements of an apparatus provided in accordance with the invention.

To accomplish the aforesaid function, the apparatus illustrated generally in FIG. 1 comprises a print pellet indexing belt 20, which is parallel to and spaced from a character belt 22. As will be shown hereinafter, a record medium such as a sheet of paper and an inked print belt are passed in parallel spaced relationship between the print pellet indexing belt 20 and the character belt 22.

As will also become apparent hereinafter, the print pellet indexing belt 20 bears a print pellet 24 which is adapted for being impelled towards a specific character or character bar arranged on the character belt 22 such as to entrap the print ribbon and record medium against the character belt and cause thereby a character to be printed on the record medium. To effect the aforesaid operation, there is provided a hammer assembly 26, the nature of which will be hereinafter indicated in greater detail. It is sufficient at this time, however, to recognize simply that the hammer assembly is intended to engage the print pellet 24 in various printing positions of the latter to effect sequential printing operations.

In further conjunction with the aforenoted features and objectives of the invention, there is provided a belt code element or code belt 28, having arranged thereon, as will be discussed in greater detail hereinafter, a sequence of coded arrangements of holes, each arrangement of which corresponds to and identifies a character to be printed.

The belt 22 and the belt 28 are driven in absolute synchronism by means of driving sprockets 30 and 32 and idlers 34 and 36.

Drive wheels 30 and 32 are connected on a common shaft 38 and idlers 34 and 36 are connected on a common shaft 40. Drive wheels 30 and 32 are driven through the intermediary of a shaft 42, by means of a synchronous motor 44, which may for example rotate at a speed of 1800 r.p.m. Said motor may be directly connected to the drive wheels 30 and 32, or alternatively, may be coupled thereto by means of a gear train or pulley system or the like.

The print pellet indexing belt 20 is driven by a drive wheel 46 at one end thereof and is supported by a sprocket idler 48 at the other end thereof. Drive wheel 46 is driven by means of a stepping motor 50, through the intermediary of a shaft 52, as will hereinafter be indicated in greater detail. The stepping motor 50 is an incremental drive of which there are a variety commercially available. It should be characterized by being compact in size and reliable in operation and is preferably of a type which is capable of operating in a range of from 0 to 200 steps per second, depending upon external inertial loads coupled thereto. The stepping motor 50 illustrated in the drawing is capable of operating from 0 to 100 cycles per second.

As will be indicated in greater detail hereinafter the record medium, such as the sheet of paper mentioned above, is intended to be supplied along a determinable path and the aforenoted print pellet 24 is intended to be displaced transversely of said path through a sequence of print positions. Because, in each position occupied by pellet 24 due to movement by belt 20, belt 22 continuously sweeps the character bars past the pellet, the pellet will ultimately be opposed by a specific character bar bearing thereon the character intended to be printed. Accordingly, it is the function of the stepping motor 50 to move the print pellet 24 incrementally transversely across the path of the thusly supplied sheet of paper so as to enable the printing of a complete line on the record medium.

In further accordance with the invention, there is provided a slit indexing belt 54, having a slit 56 provided therein. The slit 56 corresponds in position to the print pellet 24 and is displaced in synchronism therewith by means of a drive wheel 58 which is coupled to the drive wheel 46 by means of a common shaft 60.

It will be appreciated from what has been stated above that the stepping motor 50 through the intermediary of shaft 52 drives the drive wheels 46 and 58 at rates which are common to both.

The slit indexing belt 54 is further supported on the idler sprocket 62, which is coupled to the idler 48 by a shaft 64, whereby the idlers also are operated at a common speed.

In operative association with the code belt 28 is provided a light source 66, the light of which is dispersed by means of a light dispersing mechanism 62, which may be in the form of a silvered or aluminized prism, such that the light from the source 66 is dispersed generally in the direction of the code belt 28, by means of which the light is generally intercepted.

A strip photocell assembly, which is stationary, is indicated at 64 and this assembly 64 is intended to be operatively associated with the light source in such a manner as to inspect for the coded arrangements of holes provided in the code belt 28.

From what has been stated above, however, it will be appreciated that the belt 54 selectively conceals the assembly 64 from the light source 60 and the light distributing mechanism 62, so that the two are effectively isolated with the exception of the opening provided by the slit 56. The slit 56 coordinates with the position of the print pellet 24, as has been indicated generally above, and thus the photocell assembly 64 is permitted to inspect the code belt 28 only in accordance with the position of the print pellet 24. The cooperation of belts 28 and 54 assures that a character will be identified when the corresponding bar is adjacent the pellet 24 taking into consideration the movement of the pellet from position to position.

With the code belt 28 being driven continuously by the motor 44 and with the slit 56 having been positioned in accordance with the position of the print pellet 24, the photocell assembly 64 will be continuously generating a series of electronic signals according to the coded arrangements on the belt 28 which are passing adjacent the slit 56. The electrical signals thus regenerated are transmitted to photocell amplifiers 66 via lines 68 and 70 and the thusly amplified signals are transmitted via a line 72 to a comparative circuit 74 of known type.

A receiving circuit 76 is provided such as an eight bit flip-flop, into which externally supplied signals are transmitted. The purpose of the circuit 76 is to receive and retain externally supplied information signals until the signals have been appropriately employed in the apparatus of the invention.

The circuit 76 maintains the thusly received signals as constant signals on the line or lines 78, these signals being transmitted to the comparator circuit 74 for comparison with the continuously varying signals which are transmitted to the comparator circuit 74 via line 72. It will be recalled in this respect that the signals on the line 72 correspond to the coded arrangements of holes on the belt 28 which moves relative to the slit 56, as has been indicated above.

Upon appropriate comparison between the signals on lines 72 and 78 (such as an identity between the signals) the comparator circuit 74 in known manner generates a signal which is transmitted via a line 80 to an adjustable time-delay circuit 82. The delay circuit 82 transmits the signal after a suitable delay to the hammer assembly 26, actuating the latter whereby the hammer assembly 26 is activated to impel the print pellet 24 against the character belt 22 to trap the paper and print ribbon thereagainst and cause a character to be printed on the thusly processed paper. The adjustability of delay circuit 82 facilitates initially setting up the system and to coordinate actuation of hammer assembly 26 with the arrival of pellet 24 at the proper printing position.

The character which is printed on the paper will correspond to the character then being inspected by the photocell assembly 64 in the form of a coded arrangement of holes passing by the slit 56.

Although the character belt 22 is in continuous operation, the time of impact engagement between the print pellet 24 and the character belt 22 may be adjusted to be of such short duration that only a tolerable smear in the print operation is effected.

At the same time the signal controlling the hammer assembly 26 is transmitted via line 86 to a further delay device 88, wherefrom a signal is transmitted via the line 90 to external equipment (not shown), to indicate that a printing of a specific character has been effected such that new control data may be transmitted to the apparatus of the invention.

Concomitantly a signal is transmitted via line 91 to a stepping signal circuit 92, wherefrom a signal is transmitted via a line 94 to the stepping motor 50, so that the print pellet 24 is indexed to the next sequential printing position.

In the aforesaid manner, the print pellet 24 is stepped from one print position to the next and so on across the entire breadth of the associated record medium and in each position the print pellet 24 is opposed by the series of character bars or characters on the belt 22, there being effected a printing operation when the desired character as indicated by external data is brought to a position opposing the print pellet 24.

Figure 2:
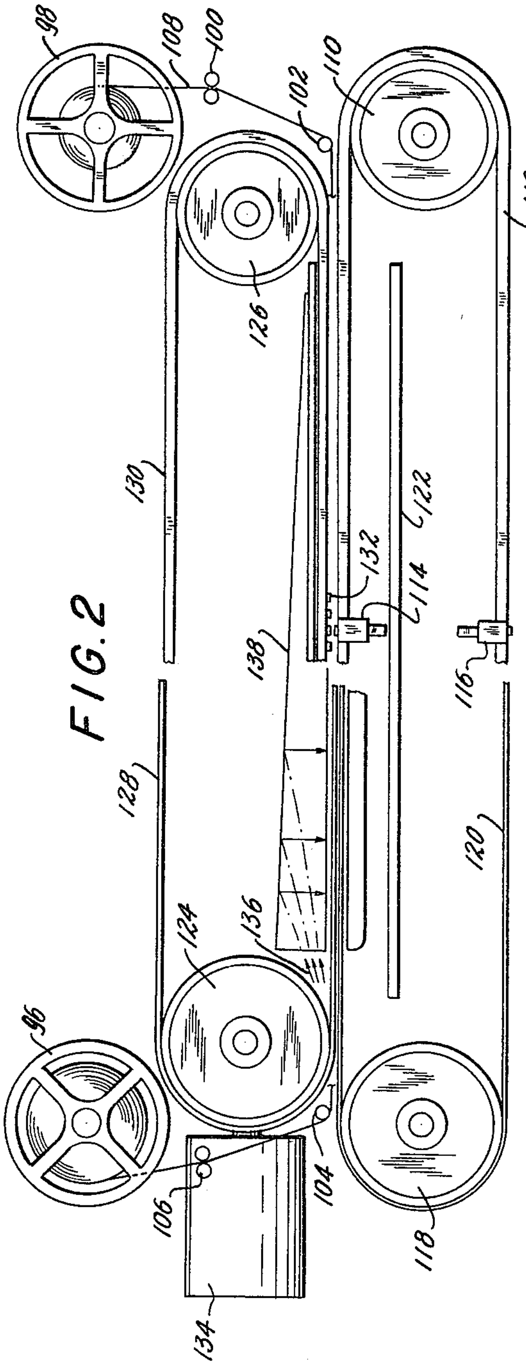
FIGURE 2 is a side view of a structure adapted to constitute various of the working elements of FIG. 1.

In the illustration of FIG. 2 are shown a ribbon supply mechanism 96 and a ribbon take-up reel 98 which supply, along with guides such as the guides 100, 102, 104 and 106, an inked print ribbon 108 which preferably is displaced transversely of the path of the associated paper (not shown) on which a printing operation is to be performed. This paper is preferably supplied in determinable direction along a path which is normal to the plane of the drawing including FIG. 2.

The drive wheels previously referred to in FIG. 1 are shown in FIG. 2 in the form of a wheel 110 driving a belt 112 on which are mounted by way of example two pellets 114 and 116, these being brought sequentially into operative position adjacent the above-noted paper so as to remove the requirement for carriage return time. Stated otherwise, only one of the print pellets 114 or 116 is operative for a particular series of printing operations so that as one of these pellets completes a line the other is brought into operative position.

FIG. 2 further illustrates a drive wheel 118, driving a masking belt 120 (constituting the belt 54 of FIG. 1) in which the slit 140 corresponding to the aforesaid slit 56 is provided. Both the belt 112 and the belt 120 are incrementally driven by the stepping motor 50 of FIG. 1 and are driven such that a slit is provided in a position corresponding to that of one of the pellets 114 or 116.

The print pellet itself may be of the ballistic type made from a heat treated high carbon chrome steel which is lapped and polished. The print pellet is supported by a bearing structure which is ground and lapped to assure uniform operation.

Preferably the print pellet has a projection at right angles to the motion and the print pellet bail or associated hammer will therefore not obscure the printed copies from the operator. This print pellet bail or hammer is indicated generally at 122 and the details of such a structure will be further discussed hereinunder.

Also illustrated in FIG. 2 are wheels 124 and 126.

Operatively associated with the wheel 124 is the code belt 128 wherein are provided the coded arrangements of holes heretofore discussed.

Operatively associated with the wheel 126 is the character belt 130, upon which are provided a plurality of characters, one of which is indicated at 132.

The motor 134 is generally indicated and serves the purpose of driving both of the aforesaid belts 128 and 130.

In addition to the aforesaid apparatus there is provided a light source 136 constituted by an incandescent bulb or the like of known type and in operative association therewith is provided a prism 138 having a mirrored surface by means of which light is directed against the code belt 128 along the entire effective length thereof.

Figure 3:
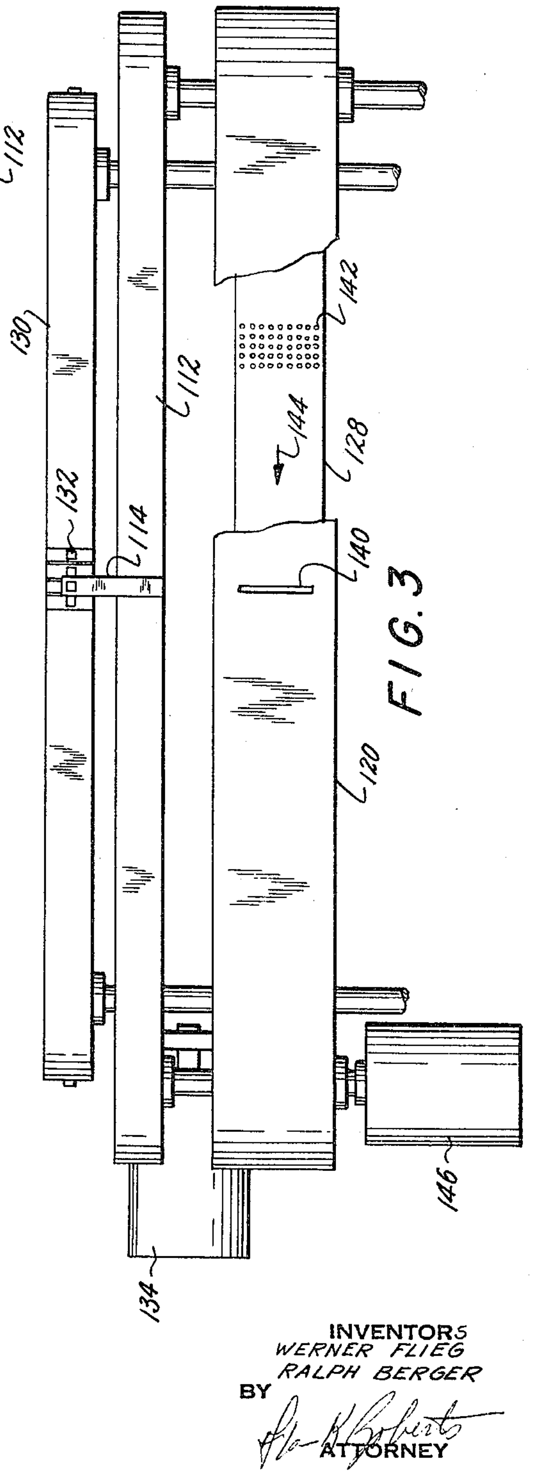
FIGURE 3 is a top plan view, partially broken away, of the apparatus of FIG. 2.

FIG. 3 illustrates generally the masking belt 120, having therein the slot 140 corresponding to the slot 56 of FIG. 1. Said masking belt 120 is operatively disposed with respect to the code belt 128, wherein are provided a sequence of coded arrangements of holes 142 which may be, for example, arranged according to a binary code.

Assuming that the motor driving the belt 128 drives the same in a direction indicated by the arrow 144, it will be apparent that sequential arrangements, which are transverse of the belt 128, of holes 142, will be brought sequentially adjacent the slit 140, such that only one coded arrangement will be exposed through the slit 140 at a time.

FIG. 3 further illustrates the character belt 130, whereupon are arranged the characters or character bars 132, as will be described in greater detail hereinafter.

Also illustrated in FIG. 3 is the print pellet indexing belt 112 corresponding to the belt 20 of FIG. 1.

As has been discussed above, the print pellets 114 and 116 are borne by the belt 112 and one such pellet 114 is indicated in FIG. 3.

FIG. 3, moreover, illustrates the various shafts by means of which the various drive wheels are supported, as well as the stepping motor 146 corresponding to the stepping motor 50 of FIG. 1.

Figure 4:
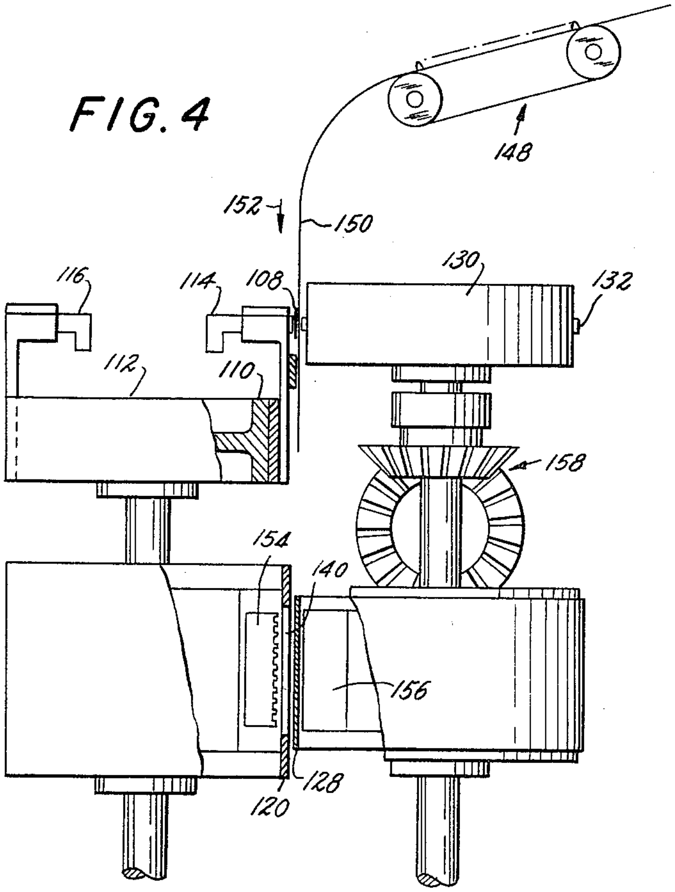
FIGURE 4 is an end view, partially broken away, of the apparatus of FIGS. 2 and 3.

The relationship of the various elements is further apparent from FIG. 4, wherein is shown an effective source 148 of paper or record medium upon which a printing operation is to be effected.

By way of example, there is illustrated a sheet 150 of paper being supplied along a determinable path illustrated, for example, by the arrow 152.

In FIG. 4 is further illustrated the character belt 130 bearing the characters 132 thereon, said character belt being opposed by the print pellets 114 and 116 borne by the belt 112 in turn driven by the wheel 110. The ribbon 108 is also illustrated in FIG. 4.

Also apparent in FIG. 4 is the relationship between the code belt 128 bearing the aforenoted coded arrangements of holes and the masking belt 120, wherein appears the slit 140 selectively exposing a bank of photoelectric cells 154 corresponding to the assembly 64 of FIG. 1.

Light dispersed by the light dispersing mechanism 156, which may be a known type of prism, passes through the arrangements of holes in the belt 128, one such arrangement being exposed by the slit 140 to the photoelectric cells 154 at a time corresponding to the position of the associated print pellet. This in turn will cause the generation of electrical signals in the manner which has been generally described above.

It also appears from FIG. 4 that the various drive wheels may be associated by means of a gear train such as generally indicated at 158.

Figure 5:
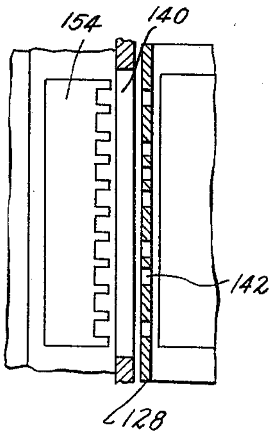
FIGURE 5 is an enlarged detail of the apparatus of FIG. 4.

FIG. 5 more specifically illustrates the belt 128, having a coded arrangement of holes 142 therein, the slit 140 selectively exposing at any given time one of said coded arrangements to a conventional bank of photocells 154.

Figure 6:
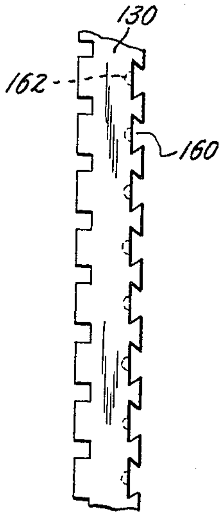
FIGURE 6 is an enlarged detail of an element of the apparatus of FIGS. 2–4.

A portion of the character belt 130 is illustrated in edge view in FIG. 6, said character belt preferably being a continuous belt molded in one piece from a material selected to be able to withstand the wear of the indicated operation. Such a material may be, for example, a polyurethane derivative. This material is presently used successfully in molding character print belts for other applications in data processing equipment. It is anticipated that the type fonts can be chrome-plated by employing a vacuum-type chrome plating process to insure good wearing qualities.

Figure 7:
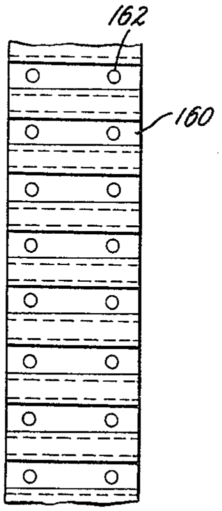
FIGURE 7 is a top plan view of the structure illustrated in FIG. 6.

As appears from FIG. 6, the belt 130 is provided with a plurality of dove-tail grooves 160, at the bottom of which are provided respective recesses 162, the purpose of which will be hereinafter made apparent. Said arrangement also appears in FIG. 7, wherein appear the grooves 160 and the recesses 162.

Figure 8:
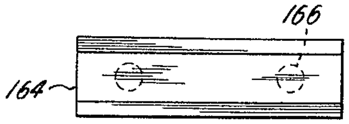
FIGURE 8 is a top plan view of a character bar adapted to cooperate with the structure of FIGS. 6 and 7.
Figure 9:
FIGURE 9 is an end view of the character bar of FIG. 8.

FIGS. 8 and 9 cooperatively show the character bars 164 which are of trapezoidal cross-section and may therefore be detachably connected with the belt 130 by being positioned in the grooves 160.

Detents 166 are provided for cooperation with recesses 160, whereby the character bars 164 are firmly fixed in position in the various grooves in the belt 130.

On the character bars 164 are mounted in conventional manner characters selected, for example, the alphabetic and commonly employed numeric series, as well as other types of characters employed in modern data processing, said characters being of conventional construction and nature and adapted to withstand the impact of a hammering operation as is required to imprint the various characters on the record medium referred to above.

Figure 10:
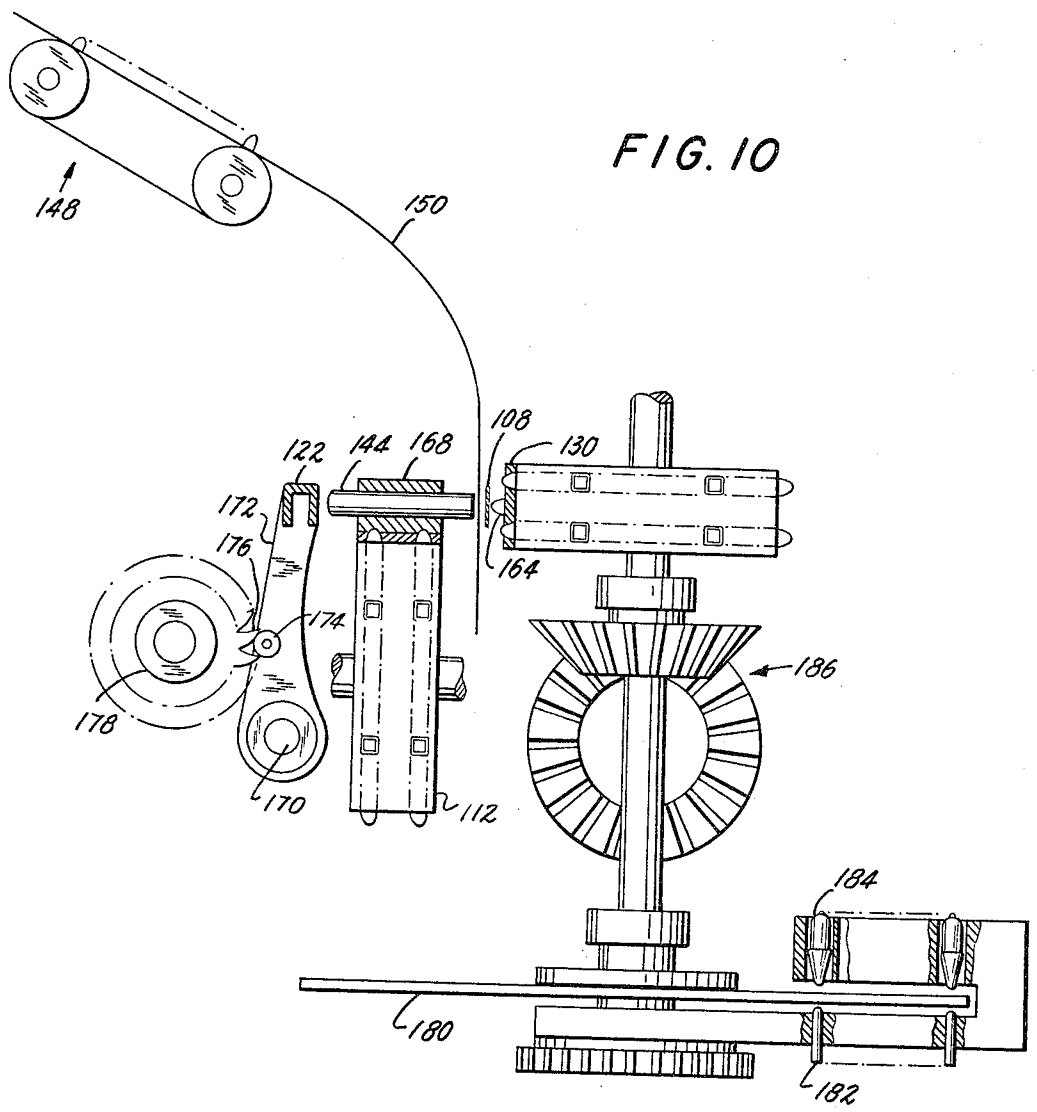
FIGURE 10 is a side view of a further embodiment of the invention illustrating a hammer means adapted for being employed with the structure of FIGS. 2–4, but in cooperation with a variation of the coded means.

FIG. 10, although illustrating a further embodiment of the invention, moreover serves to illustrate a preferred type of hammer means cooperating with the aforesaid print pellet to effect a printing operation.

More particularly, there is illustrated in FIG. 10, the print pellet belt 112, upon which, by way of example, is supported a print pellet 144, mounted in a bearing 168.

As has been heretofore indicated, the print pellets are displaced transversely across the breadth of the sheet of paper 150 supplied by source 148, so as to occupy sequentially a series of print positions constituting a line of print.

The print bail 122, heretofore indicated with respect to FIG. 2, constitutes a hammer by means of which the print pellet 114 is impelled towards a character bar 164, arranged on the character belt 130, and said bail or hammer 122 is of such a dimension as to extend across the entire breadth of the printed line or approximately the entire breadth of the paper 150.

Said bail or hammer 122 is mounted on a shaft 170 and is effectively supported on a yoke 172, said yoke bearing a wheel 174 engaged by the teeth 176 of a cam diagrammatically indicated at 178.

It will be readily appreciated from what has been stated above that the yoke 172 can be spring-loaded by a spring (not shown) and impelled by the series of teeth 166 in conventional manner by rotation of the cam generally indicated at 178.

The impelling of the bail or hammer 122 against the print pellet 114 will cause the latter to be directed against the characters 164 as the cam 178 is actuated, the impelling of the print pellet 114 sandwiching the paper 150 and the print ribbon 108 against the various character bars to cause a printed operation to be effected.

The embodiment illustrated in FIG. 10 is a variation of the apparatus heretofore described in that a coded disc 180 is substituted for the above-noted belt, said disc 180 being provided with a series of radially arranged coded arrangements of holes (as shown, for example, in Pat. 3,218,631) which are inspected by the photocells generally indicated at 182, the light being provided by a plurality of light sources 184 constituted by conventional incandescent bulbs supplied for this purpose.

Also illustrated in FIG. 10 are the gears constituting a gear train 186, by means of which the various drive wheels may be driven in synchronism.

From the above it will be appreciated that the proposed printer utilizes a unique system, wherein is employed a continuously moving print character belt coupled with a Mylar code belt, a cooperating print pellet being provided to cooperate with a slit index which effectively travels one column at a time with the print pellet, there being further provided a special hammer having a full page width head.

When the hammer is actuated it hits the print pellet at the correct time to impact the ribbon-paper-carbon forms against the proper character on the character belt.

The dwell time is sufficiently short to prevent noticeable smear.

As to the photocell assembly referred to above, this may extend over the full writing line of the printer. There may be eight data photocell strips and one clock photocell strip, the latter of which may be replaced by a clock disc mounted on one of the motor shafts. The preferred photocell material is of the selenium photovoltaic type. Other types of materials may also be employed. Preferably the photocell strips are separated by barrier strips and are recessed to prevent cross-talk. These barrier strips may also aid in guiding the masking belt, as will be apparent from the above description.

As has been noted above, the character belt has individually removable characters so that any type font or character or character arrangement can be supplied as part of the apparatus without incurring the high cost of additional belt moldings. It is also possible to replace characters in the field should damage occur. Each character is nevertheless secured in position to withstand the centrifugal and other forces which may occur under various environmental conditions. This, however, is all accomplished within the framework of making the characters very easy to remove.

There will now be obvious to those skilled in the art many modifications and variations of the apparatus set forth above. These modifications and variations will not, however, depart from the scope of the invention if defined by the following claims.

What is claimed is:

1. In combination with a source of paper adapted for feeding paper along a determinable path and a source of print ribbon adapted for supplying said ribbon in juxtaposed relation to said paper: printer apparatus comprising hammer and character means adapted for sandwiching said paper and ribbon therebetween, said character means including a plurality of characters for effecting a printing operation, first drive means adapted for continuously displacing said characters adjacent said path, code means coupled to said drive means and driven thereby in synchronism with said character means, said code means coupled to said drive means and driven responding to and identifying respective of said characters, print means adapted for being displaced stepwise through a sequence of print positions arranged adjacent said path, said print means being displaceable towards said character means to impel said paper and ribbon against a selected one of said characters, inspection means adapted for inspecting the coded arrangements, masking means between said inspection means and code means for generally isolating the same, said masking means selectively exposing the code means to said inspection means for selective inspection of said coded arrangements, said masking means being coupled to said print means for being driven in synchronism with said print means, said hammer means being operatively disposed with respect to said print means in any print position of the latter to propel the same towards said character means and means actuated by said inspection means and coupled to said hammer means to actuate the latter.

2. Printer apparatus comprising means for feeding paper along a determinable path, means for supplying a print ribbon in juxtaposed relation to said paper transversely of said path, hammer and character presenting means sandwiching said paper and ribbon therebetween, said character means being arranged transversely of said path and having a plurality of characters thereon, first drive means adapted for continuously driving said belt and displacing said characters transversely of said path, a code belt coupled to said drive means and driven thereby in synchronism with said character means, said code belt being provided with coded arrangements of holes corresponding to and identifying respective of said characters, a print pellet, second drive means coupled to and adapted to displace said pellet stepwise through a sequence of print positions arranged transversely of said path, said pellet being displaceable towards said character means to impel said paper and ribbon against a selected one of said characters, light means operatively associated with said code belt to direct light through the holes in the latter, photoelectric means adapted for inspecting the coded arrangements of holes, a masking belt between said photoelectric means and code belt for generally isolating the same, said masking belt being provided with an opening for selectively exposing the code belt to said photoelectric means for selective inspection of said coded arrangements of holes, said masking belt being coupled to said second drive means for being driven in synchonism with said pellet, said hammer means being operatively disposed with respect to said pellet in any print position of the latter to engage the said pellet and propel the same towards said character means, and means responsive to said photoelectric means and coupled to said hammer means to actuate the latter.

3. A serial printer apparatus comprising means for feeding paper along a determinable path, means for supplying a print ribbon in juxtaposed relation to said paper, hammer and character means sandwiching said paper and ribbon therebetween, said character means being arranged transversely of said path and having a plurality of characters thereon, first drive means adapted for continuously driving said character means and displacing said characters transversely of said path, a code belt coupled to said drive means and driven thereby in synchronism with said character means, said code belt being provided with coded arrangements of holes corresponding to and identifying respective of said characters, a print pellet, second drive means coupled to and adapted to displace said pellet stepwise through a sequence of print positions arranged transversely of said path, said pellet being displaceable towards said endless belt to impel said paper and ribbon against a selected one of said character bars, light means operatively associated with said code belt to direct light through the holes in the latter, photoelectric means adapted for inspecting the coded arrangements of holes, a masking belt between said photoelectric means and code belt for generally isolating the same, said masking belt being provided with an opening for selectively exposing the code belt to said photoelectric means for selective inspection of said coded arrangements of holes, said masking belt being coupled to said second drive means for being driven in synchronism with said pellet, said hammer means being operatively disposed with respect to said pellet in any print position of the latter to engage the said pellet and propel the same towards said character means, and comparison means for receiving an electric signal indicative of a character to be printed, the comparison means being coupled to said photoelectric means to receive electric signals therefrom representative of said characters and to compare the first said signal therewith, said comparison means being coupled to said hammer means to actuate the same upon determining identity between compared signals.

4. A serial printer apparatus comprising means for feeding paper along a determinable path, means for supplying a print ribbon in juxtaposed relation to said paper transversely of said path, hammer and character means sandwiching said paper and ribbon therebetween, said character means being arranged transversely of said path and having a plurality of characters thereon, first drive means adapted for continuously driving said character means and displacing said characters transversely of said path, a code belt coupled to said drive means and driven thereby in synchronism with said character means, said code belt being provided with coded arrangements of holes corresponding to and identifying respective of said characters, a print pellet, second drive means coupled to and adapted to displace said pellet stepwise through a sequence of print positions arranged transversely of said path, said pellet being displaceable towards said character means to impel said paper and ribbon against a selected one of said characters, light means operatively associated with said code belt to direct light through the holes in the latter, photoelectric means adapted for inspecting the coded arrangements of holes, a masking belt between said photoelectric means and code belt for generally isolating the same, said masking belt being provided with an opening for selectively exposing the code belt to said photoelectric means for selective inspection of said coded arrangements of holes, said masking belt being coupled to said second drive means for being driven in synchronism with said pellet, said hammer means including a hammer operatively disposed with respect to said pellet in any print position of the latter to engage the said pellet and propel the same towards said character means, said hammer means further including a cam device engaging said hammer and being adapted upon actuation to propel said hammer against said pellet, comparison means for receiving an electric signal indicative of a character to be printed, the comparison means being coupled to said photoelectric means to receive electric signals therefrom representative of said characters and to compare the first said signal therewith, said comparison means being coupled to said hammer means to actuate said cam device to actuate the hammer upon determining identity between compared signals, and delay means coupled to said comparison means and said second drive means to actuate the latter to advance said pellet following an actuation of said cam device.

5. A serial printer apparatus comprising means for feeding paper along a determinable path, means for supplying a print ribbon in juxtaposed relation to said paper transversely of said path, hammer and character presenting means sandwiching said paper and ribbon therebetween, said character presenting means comprising an endless belt arranged transversely of said path and including a plurality of character bars, first drive means adapted for continuously driving said belt and displacing said character bars transversely of said path, a code belt coupled to said drive means and driven thereby in synchronism with said endless belt, said code belt being provided with coded arrangements of holes corresponding to and identifying respective of said character bars, a print pellet, second drive means coupled to and adapted to displace said pellet stepwise through a sequence of print positions arranged transversely of said path, said pellet being displaceable towards said endless belt to impel said paper and ribbon against a selected one of said character bars, light means operatively associated with said code belt to direct light through the holes in the latter, photoelectric means adapted for inspecting the coded arrangements of holes, a masking belt between said photoelectric means and code belt for generally isolating the same, said masking belt being provided with an opening for selectively exposing the code belt to said photoelectric means for selective inspection of said coded arrangements of holes, said masking belt being coupled to said second drive means for being driven in synchronism with said pellet, said hammer means including a hammer operatively disposed with respect to said pellet in any print position of the latter to engage the said pellet and propel the same towards said endless belt, said hammer means further including a cam device engaging said hammer and being adapted upon actuation to propel said hammer against said pellet, comparison means for receiving an electric signal indicative of a character to be printed, the comparison means being coupled to said photoelectric means to receive electric signals therefrom representative of said character bars and to compare the first said signal therewith, said comparison means being coupled to said hammer means to actuate said cam device to actuate the hammer upon determining identity between compared signals, and delay means coupled to said comparison means and said second drive means to actuate the latter to advance said pellet following an actuation of said cam device and to generate an electrical signal indicative of the performance of a printing operation.

6. A serial printer apparatus comprising means for feeding paper along a determinable path, means for supplying a print ribbon in juxtaposed relation to said paper transversely of said path, hammer and character presenting means sandwiching said paper and ribbon therebetween, said character presenting means comprising an endless belt arranged transversely of said path and a plurality of character bars detachably mounted on said belt, first drive means adapted for continuously driving said belt and displacing said character bars transversely of said path, a code belt coupled to said drive means and driven thereby in synchronism with said endless belt, said code belt being provided with coded arrangements of holes corresponding to and identifying respective of said character bars, a print pellet, second drive means coupled to and adapted to displace said pellet stepwise through a sequence of print positions arranged transversely of said path, said pellet being displaceable towards said endless belt to impel said paper and ribbon against a selected one of said character bars, a light source, means operatively associated with said light source and said code belt to direct light through the holes in the latter, photoelectric means adapted for inspecting the coded arrangements of holes, a masking belt between said photoelectric means and code belt for generally isolating the same, said masking belt being provided with an opening for selectively exposing the code belt to said photoelectric means for selective inspection of said coded arrangements of holes, said masking belt being coupled to said second drive means for being driven in synchronism with said pellet, said hammer means including a hammer operatively disposed with respect to said pellet in any position of the latter to engage the said pellet and propel the same towards said endless belt, said hammer means further including a cam device engaging said hammer and being adapted upon actuation to propel said hammer against said pellet, comparison means for receiving an electric signal indicative of a character to be printed, the comparison means being coupled to said photoelectric means to receive electric signals therefrom representative of said character bars and to compare the first said signal therewith, said comparison means being coupled to said hammer means to actuate said cam device to actuate the hammer upon determining identity between compared signals, and delay means coupled to said comparison means and said second drive means to actuate the latter to advance said pellet following an actuation of said cam device and to generate an electrical signal indicative of the performance of a printing operation.

7. A serial printer apparatus comprising a source of paper adapted for feeding paper along a determinable path, a source of print ribbon including ribbon feeding and take-up mechanisms adapted for supplying said ribbon in juxtaposed relation to said paper transversely of said path, hammer and character presenting means sandwiching said paper and ribbon therebetween, said character presenting means comprising an endless belt arranged transversely of said path and a plurality of character bars detachably mounted on said belt, first drive means adapted for continuously driving said belt and displacing said character bars transversely of said path, a code belt coupled to said drive means and driven thereby in synchronism with said endless belt, said code belt being provided with coded arrangements of holes corresponding to and identifying respective of said character bars, a print pellet, second drive means coupled to and adapted to displace said pellet stepwise through a sequence of print positions arranged transversely of said path, said pellet being displaceable towards said endless belt to impel said paper and ribbon against a selected one of said character bars, a light source, means operatively associated with said light source and said code belt to direct light through the holes in the latter, photoelectric means adapted for inspecting the coded arrangements of holes, a masking belt between said photoelectric means and code belt for generally isolating the same, said masking belt being provided with an opening for selectively exposing the code belt to said photoelectric means for selective inspection of said coded arrangements of holes, said masking belt being coupled to said second drive means for being driven in synchronism with said pellet, said hammer means including a hammer operatively disposed with respect to said pellet in any print position of the latter to engage the said pellet and propel the same towards said endless belt, said hammer means further including a cam device engaging said hammer and being adapted upon actuation to propel said hammer against said pellet, comparison means for receiving an electric signal indicative of a character to be printed, the comparison means being coupled to said photoelectric means to receive electric signals therefrom representative of said character bars and to compare the first said signal therewith, said comparison means being coupled to said hammer means to actuate said cam device to actuate the hammer upon determining identity between compared signals, and delay means coupled to said comparison means and said second drive means to actuate the latter to advance said pellet following an actuation of said cam device and to generate an electrical signal indicative of the performance of a printing operation.

References Cited by the Examiner

UNITED STATES PATENTS

| | | | |
|---|---|---|---|
| 2,267,661 | 12/1941 | Meyers | 101—111 |
| 2,757,775 | 8/1956 | Hickerson | 197—149 |
| 2,831,424 | 4/1958 | MacDonald | 101—93 |
| 2,843,243 | 7/1958 | Masterson | 101—93 |
| 2,926,602 | 3/1960 | MacDonald | 101—93 |
| 2,990,767 | 7/1961 | Demer et al. | 101—93 |
| 3,041,964 | 7/1962 | Simpson et al. | 101—93 |
| 3,041,965 | 7/1962 | Sasaki | 101—111 |
| 3,115,092 | 12/1963 | Sasaki | 101—93 |
| 3,135,195 | 6/1964 | Potter | 197—49 |
| 3,168,182 | 2/1965 | Bernard et al. | 197—55 |

WILLIAM B. PENN, *Primary Examiner.*